United States Patent [19]

Suzuki

[11] Patent Number: 4,855,766
[45] Date of Patent: Aug. 8, 1989

[54] IMAGE RECORDING APPARATUS DETECTING AND CONTROLLING IMAGE CONTRAST

[75] Inventor: Akio Suzuki, Tokyo, Japan

[73] Assignee: Canon Kabushiki Kaisha, Tokyo, Japan

[21] Appl. No.: 298,853

[22] Filed: Jan. 19, 1989

Related U.S. Application Data

[63] Continuation of Ser. No. 464,879, Feb. 8, 1983, abandoned.

[30] Foreign Application Priority Data

Feb. 19, 1982 [JP] Japan ................................. 57-24435

[51] Int. Cl.$^4$ ..................... G01D 15/14; G01D 9/42
[52] U.S. Cl. ................... 346/160; 355/208; 355/214; 346/108
[58] Field of Search ............. 346/107 R, 108, 153.1, 346/160; 355/14 C, 14 E; 354/5; 430/31

[56] References Cited

U.S. PATENT DOCUMENTS

| 4,248,524 | 2/1981 | Takahashi | 355/14 E |
| 4,358,520 | 11/1982 | Hirayama | 355/14 C |
| 4,408,871 | 10/1983 | Kojima | 355/14 R |
| 4,513,300 | 4/1985 | Tatsuno et al. | 346/160 |

FOREIGN PATENT DOCUMENTS

| 55-89859 | 7/1980 | Japan | 355/14 E |
| 59-79264 | 5/1984 | Japan | 355/4 |

Primary Examiner—E. A. Goldberg
Assistant Examiner—Mark Reinhart
Attorney, Agent, or Firm—Fitzpatrick, Cella, Harper & Scinto

[57] ABSTRACT

Image recording capable of controlling image recording condition in response to image contrast and sensitivity characteristics of a recording member includes a detector for detecting the surface condition of the recording member and control apparatus for determining image contrast from the output signals from the detector and controlling the image recording condition of a recording device in response to the image contrast thus determined.

12 Claims, 3 Drawing Sheets

IMAGE RECORDING APPARATUS DETECTING AND CONTROLLING IMAGE CONTRAST

This application is a continuation of application Ser. No. 464,879 filed Feb. 8, 1983, now abandoned.

BACKGROUND OF THE INVENTION

1. Field of the Invention

The present invention relates to an image recording apparatus utilizing an electrophotographic process such as a laser beam printer or a copier, and more particularly to such image recording apparatus capable of adequately controlling the image recording conditions thereby constantly providing clear images.

2. Description of the Prior Art

As an example of an image recording apparatus utilizing an electrophotographic process there is already known the so-called laser beam printer.

In such printer a photosensitive drum composed of a photoconductive material is first uniformly charged and then exposed to a laser beam to form an electrostatic latent image. Said image is rendered visible with toner, and the obtained visible image is transferred onto a plain paper sheet (transfer sheet) and fixed thereon to obtain a hard copy. In such printer the intensity of the laser beam has to be maintained at an appropriate level in order to obtain a latent image of an adequate potential contrast. In case the intensity of the laser beam is below an adequate level, the potential contrast of the latent image becomes deficient for satisfactory image development, so that the obtained image will have an insufficient density. On the other hand, in case the intensity of the laser beam is excessive, image lines become thicker though the image density is sufficient, so that a clear image cannot be obtained. For this reason, even if the printing operation is conducted with such an intensity of laser beam as to obtain an optimum potential contrast, clear images cannot often be obtained because of thick image lines.

SUMMARY OF THE INVENTION

An object of the present invention is to provide an image recording apparatus not associated with the foregoing drawbacks and capable of constantly providing clear images in a stable manner.

Another object of the present invention is to provide an image recording apparatus capable of controlling image recording conditions in response to the image contrast on a recording member.

Still another object of the present invention is to provide an image recording apparatus capable of controlling image recording conditions in response to the image contrast and the sensitivity characteristics of a recording member.

The foregoing and still other objects of the present invention will become fully apparent from the following description.

DETAILED DESCRIPTION OF THE PREFERRED EMBODIMENTS

Now the present invention will be clarified in detail by the following description to be taken in conjunction with the attached drawings.

Figure 1:
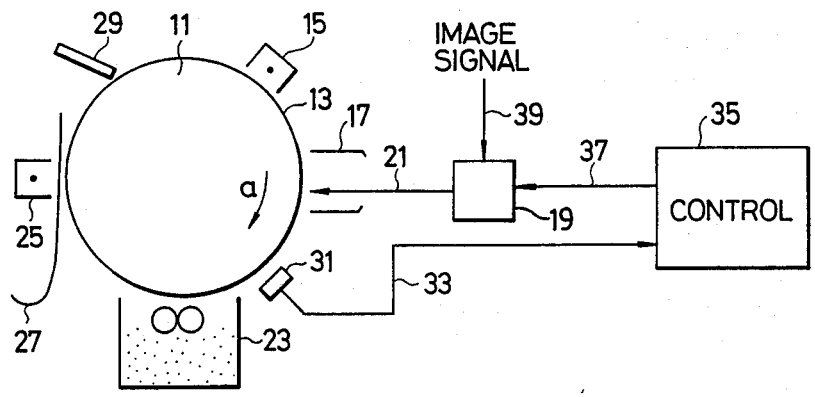
FIG. 1 is a schematic view showing a laser beam printer embodying the present invention.

FIG. 1 shows a laser beam printer embodying the present invention, wherein a photosensitive member 13 formed on a photosensitive drum 11 rotated in a direction a is first uniformly charged with a primary charger 15, then is subjected to an AC charge elimination or a DC charge elimination of a polarity opposite to that of said primary charging by means of a secondary charger 17, simultaneously with imagewise exposure by a laser beam 21 emerging from a semiconductor laser unit 19, and is subsequently exposed uniformly to the light from a lamp, not shown, thereby forming an electrostatic latent image on said photosensitive member 13. Said latent image is rendered visible by the deposition of toner in a developing station 23, and the obtained image is transferred by a transfer charger 25 onto a transfer sheet 27. The photosensitive member 13 is cleaned with a cleaning blade 29 for removing the toner remaining on said member, and is used again for the above-described imaging cycle. The electrostatic potential of the latent image formed on the photosensitive member 13 of the drum 11 in response to the laser beam 21 is detected by a potential sensor 31 and is measured in a control unit 35 by detection signals 33 from said sensor. Said control unit 35 controls the quantity of laser beam 21 through laser current control signals 37 supplied to the semiconductor laser unit 19. The quantity of laser beam irradiation onto the photosensitive member 13 corresponds to the level of the image signals 39 which in turn correspond to an image of an original document (not shown) to be copied. Subsidiary scanning is achieved by the rotation of the photosensitive drum 11 in the direction a, and the main scanning is achieved by the deflection of the laser beam 21 in a direction perpendicular to said direction a.

Said control unit 35 is composed principally of a known one-chip microcomputer with ROM, RAM etc.

Figure 2:
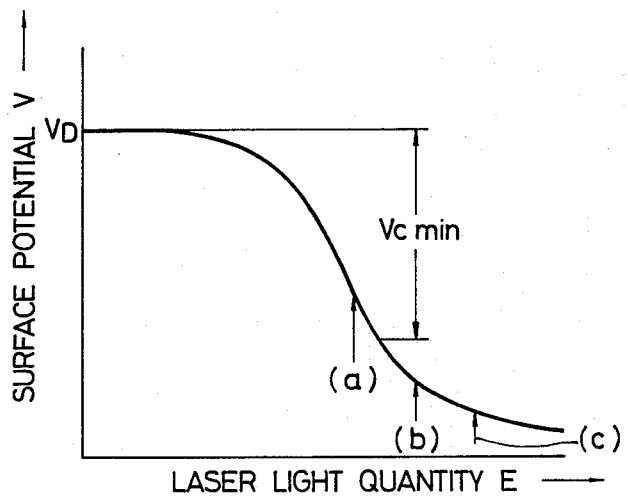
FIG. 2 is a chart showing the surface potential V of a photosensitive drum plotted against the quantity E of laser beam light.

In such an electrophotographic process as explained above, the obtained image is significantly affected by the E-V curve of the photosensitive drum 11, the E-V curve graphically depicts the sensitivity characteristic and represents the relationship between the surface potential of the recording member and the quantity of its exposure to light. As an example, in a photosensitive drum 11 with an E-V curve as shown in FIG. 2, in which $V_{cmin}$ indicates a minimum potential contrast required for obtaining a clear image, a laser light quantity corresponding to (a) only provides a deficient image density because of a deficient potential contrast. A larger laser light quantity corresponding to (b) provides a sufficient potential contrast which allows one to obtain a clear image. However a still larger laser light quantity corresponding to (c) gives rise to thicker image lines although a sufficiently high image density can be obtained because of a high potential contrast, so that the obtained image becomes no longer clear because of insufficient resolution. This phenomenon can be explained as follows.

Figure 3:
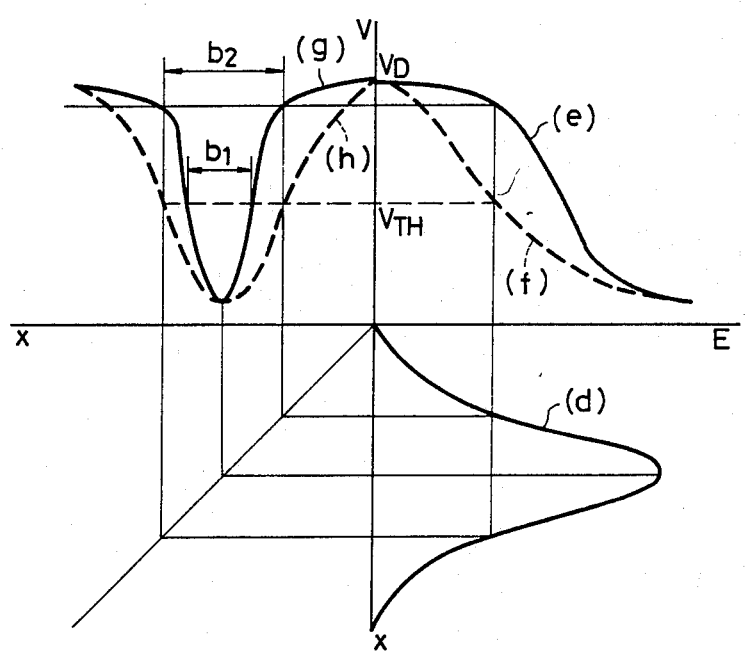
FIG. 3 is a chart showing the relationship between said quantity and said surface potential.

The quantity of light of the laser beam 21, as a function of distance from the center thereof, is known to have a Gaussian distribution as shown by a curve (d) in FIG. 3. In case the photosensitive drum 11 has an E-V curve as shown by (e), there will be obtained a latent image as represented by a curve (g), which will provide a spot image with a diameter b1 after development at a threshold value $V_{TH}$. On the other hand, for an E-V curve of a smaller inclination as shown by (f), there will be obtained a latent image as represented by a curve (h), which will provide a spot image with a larger diameter b2, i.e. a thicker image line and a lower sharpness. Since the sharpness of the image is dependent on the slope of the E-V curve, a clear image cannot be obtained with an E-V curve of a small inclination even if the potential contrast is sufficiently high. In the present embodiment, therefore, the quantity of laser beam light E is rendered variable and is regulated to an optimum value in response to the measurements of the potential contrast and of the inclination of the E-V curve, thereby providing constantly clear images.

Figure 4:
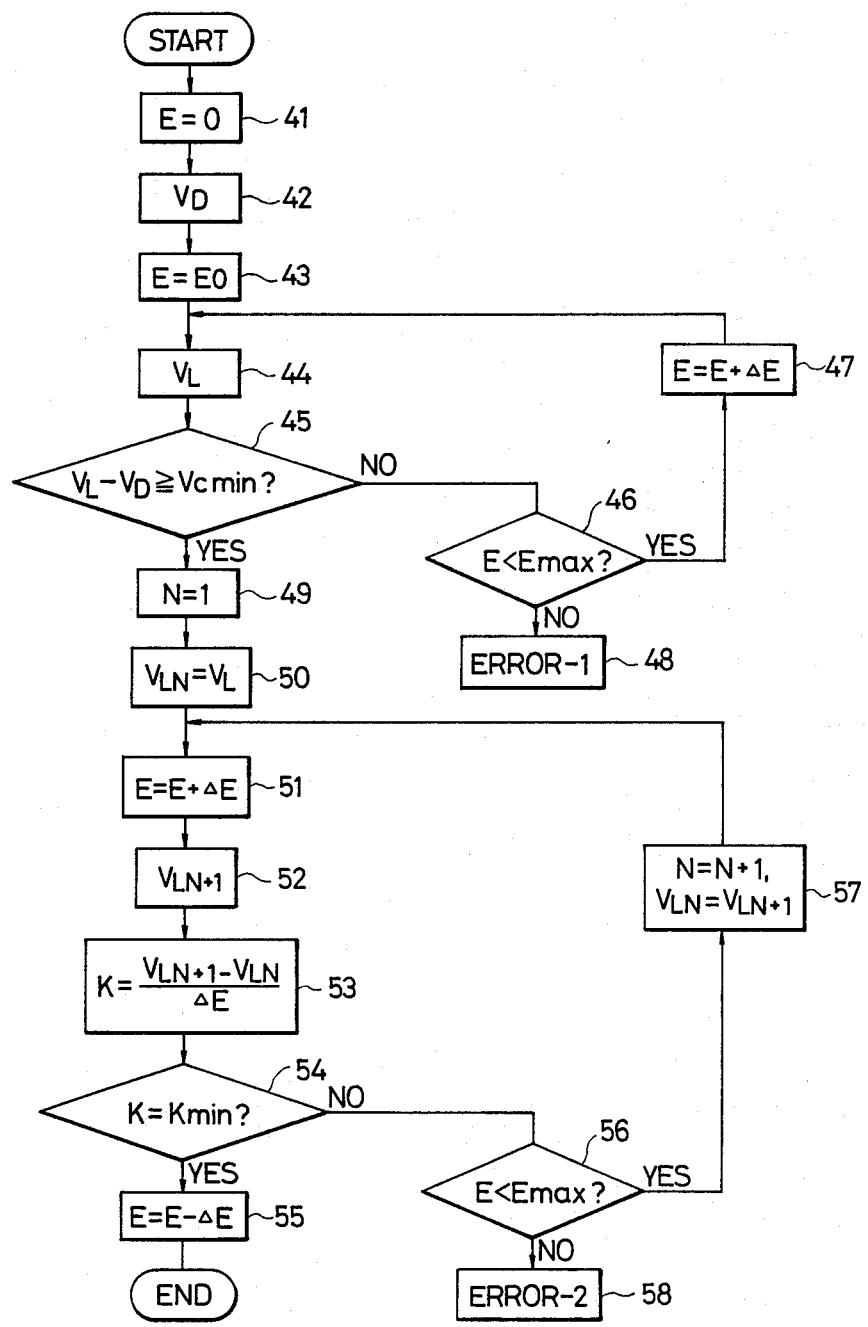
FIG. 4 is a flow chart showing a control procedure employed in the present invention.

FIG. 4 shows a flow chart of a control sequence to be executed prior to the image recording in the embodiment of the present invention. In this flow chart, E, $V_D$ and $V_L$ respectively stand for the laser light quantity, dark potential and light potential. At first the control unit 35 controls the laser control current 37 to regulate the quantity E of the laser beam 21 to zero (step 41), and the dark potential $V_D$ is measured (step 42). Then the control unit 35 controls the laser light quantity E to a reference value E0 (step 43), and the light potential $V_L$ is detected with the potential sensor 31 and measured by the control unit 35 (step 44). A step 45 discriminates whether the potential contrast reaches the minimum necessary value $V_{cmin}$, and, if not, a step 46 is executed to discriminate whether the laser light quantity E reaches an upper limit quantity $E_{max}$. If said laser beam quantity is below the upper limit, a step 47 increases the laser light quantity E by a small amount $\Delta E$, and the program returns to the step 44 to discriminate again whether the potential contrast has exceeded $V_{cmin}$. This cycle is repeated until the potential contrast exceeds the level $V_{cmin}$. However, in case the contrast does not reach said level $V_{cmin}$ even after the laser light quantity E exceeds the upper limit $E_{max}$, the program branches from the loop by the negative discrimination in the step 46 to a step 48 for generating an error message "1", indicating an error in the chargers or in the laser unit 19 or a deterioration of the photosensitive drum.

On the other hand, in case the step 45 discriminates that the potential contrast exceeds the level $V_{cmin}$, a counter (not shown) indicating the number N of light potential measurements is activated to "1" (step 49), and the light potential $V_L$ in this state is measured and stored in a determined area of the random access memory RAM of the microcomputer in the control unit 35 (step 50). Potential $V_{LN}$ is defined as the N-th measured light potential $V_L$. Subsequently the control unit 35 increases the laser light quantity E by a small amount $\Delta E$ (step 51), and the corresponding light potential $V_{LN+1}$ is measured (step 52). The slope K of the E-V curve in a range between the laser light quantities E and $E+\Delta E$ is calculated from said measured light potential $V_{LN+1}$ and the preceding measured light potential $V_{LN}$ (step 53), and said inclination K is compared with a determined value $K_{min}$ (step 54). If said slope K exceeds the value $K_{min}$, the laser light quantity E is reduced by $\Delta E$ (step 55) and the control procedure is completed. Image recording operation is conducted subsequent to said control procedure. On the other hand, if the slope K of the E-V curve does not reach the determined value in the step 54, a step 56 is executed to discriminate whether the laser light quantity E exceeds a determined maximum value $E_{max}$. If not, the number of measurement N is increased by one, the measured light potential $V_{LN+1}$ is defined as the N-th measured light potential $V_{LN}$ and stored (step 57), and the program returns to the step 51. Thus the laser light quantity E is increased by $\Delta E$ (step 51) to discriminate whether the slope of the E-V curve in the range of said $\Delta E$ reaches the determined value. If the slope K of the E-V curve is deficient even though the laser light quantity E exceeds the determined value as determined by the negative discrimination in the step 56, a step 58 generates an error message "2" indicating a deterioration of the photosensitive drum.

The control of the laser light quantity E in the present embodiment is achieved by the regulation of the current in the semiconductor laser unit 19, a similar control is also possible, for example for a He-Ne laser, by a rotary filter inserted into the optical path of the laser beam or by mutually rotating two polarizing filters positioned in the optical path. Also in case the variation $\Delta E$ of the laser light quantity E is constant, it is also possible to determine, in the step 53 in the flow chart shown in FIG. 4, $V_{LN+1}-V_{LN}$ instead of $(V_{LN+1}-V_{LN})/\Delta E$ and to discriminate in the step 54 whether the amount $V_{LN+1}-V_{LN}$ exceeds a determined amount $\Delta V_{Lmin}$. Also in a printer utilizing a light-emitting diode, the quantity of light emitted by said diode can be controlled in a similar manner. In summary the laser light quantity should be controlled in such a manner that both the potential contrast and the slope of the E-V curve respectively exceed certain determined values.

In the present embodiment, in which the laser light quantity is so controlled that the potential contrast and the slope of E-V curve both exceed certain determined values, it is rendered possible to compensate the deterioration of the photosensitive drum, and thus to constantly obtain clear images. Such process is also effective for a case of deterioration of the laser although the photosensitive drum is normal, and clear images can be obtained by increasing the laser light quantity by an increase of the laser current or by a suitable control of the filter or polarizing filters in the optical path.

Although the foregoing embodiment depends on the detection of surface potential on the photosensitive drum, the present invention is not limited to such method but may employ, for example, the detection of image density after image development.

Also the foregoing embodiment is so constructed as to control the quantity of laser light, but it is also possible to control for example the amount of charging or the level of developing bias.

As explained in the foregoing, the present invention allows constant production of clear images in a stable manner by the control of the image recording conditions in response to the image contrast.

The present invention is by no means limited to the foregoing embodiment but is subject to various modifications and variations within the scope and spirit of the appended claims.

What I claim is:

1. An image recording apparatus comprising:
   an image recording member having a variable sensitivity characteristic;
   image recording means for recording an image on said recording member;

detecting means for detecting a surface condition of said recording member; and control means for controlling an image recording condition of said image recording means in accordance with an output of said detecting means, said control means controlling the image recording condition such that (i) the contrast of the image formed on the recording member by said image recording means is determined in accordance with the output of said detecting means, and the determined contrast exceeds a predetermined value; and then (ii) the slope of the sensitivity characteristic of said recording member at a point, at which the contrast of the image exceeding said predetermined value is determined, is determined in accordance with the output of said detecting means, and the determined slope satisfies a predetermined relationship.

2. an image recording apparatus according to claim 1, wherein said image recording means comprises light beam generating means for irradiating said recording member, and said image recording condition is the quantity of said light beam.

3. An image recording apparatus according to claim 1, wherein said surface condition is the surface potential of a latent image formed on said recording member.

4. An image recording apparatus according to claim 2, wherein said sensitivity characteristic is the relationship between the surface potential of said recording member and the quantity of exposure to light, and said control means is adapted to control said image recording condition in such a manner that the ratio of a variation in the surface potential to a variation in the quantity of exposure to light becomes equal to or exceeds a determined value.

5. An image recording apparatus according to claim 1, wherein said control means is adapted to generate an error signal in case said image contrast is less than said determined value but said image recording condition is in a determined state.

6. An image recording apparatus according to claim 1, wherein said control means is adapted to generate an error signal in case said sensitivity characteristic is not in said determined relation but said image recording condition is in said determined state.

7. An image recording apparatus according to claim 1, wherein said determined state is a state in which the quantity of light exceeds a maximum limit value.

8. An image recording apparatus comprising:
a recording member having a variable sensitivity characteristic;

recording means for recording an image by exposing said recording member with a light beam;

detecting means for detecting a surface condition of said recording member; and control means for controlling a quantity of the light beam in accordance with an output of said detecting means, wherein said control means determines the slope of the sensitivity characteristic of said recording member at a point at which a first relationship is satisfied, in accordance with the output of said detecting means, and controls said quantity of the light beam so that the determined slope satisfies a second relationship.

9. An image recording apparatus according to claim 8, wherein said control means obtains a slope at each point on the curve representing said sensitivity characteristic in accordance with the output of said detecting means, and sets the quantity of the light beam at a value at which the slope satisfies a predetermined relation.

10. An image recording apparatus according to claim 9, wherein said control means further obtains an image contrast in accordance with the output of said detecting means, and set the quantity of the light beam so that said image contrast exceeds a predetermined value, and said slope satisfies a predetermined relation.

11. An image recording apparatus according to claim 9, wherein said predetermined relation is that said slope exceeds a predetermined value.

12. An image recording apparatus according to claim 10, wherein said predetermined relation is that said slope exceeds a predetermined value.

* * * * *

UNITED STATES PATENT AND TRADEMARK OFFICE
CERTIFICATE OF CORRECTION

PATENT NO. : 4,855,766
DATED : August 8, 1989
INVENTOR(S) : AKIO SUZUKI

It is certified that error appears in the above-identified patent and that said Letters Patent is hereby corrected as shown below:

COLUMN 6

Line 5, "1," should read --5,--.

Signed and Sealed this

Third Day of April, 1990

Attest:

HARRY F. MANBECK, JR.

*Attesting Officer*      *Commissioner of Patents and Trademarks*